(12) United States Patent
Garvey et al.

(10) Patent No.: US 11,972,442 B1
(45) Date of Patent: Apr. 30, 2024

(54) SCALABLE SYSTEM AND METHODS FOR CURATING USER EXPERIENCE TEST RESPONDENTS

(71) Applicant: Wevo, Inc., Boston, MA (US)

(72) Inventors: Dustin Garvey, Exeter, NH (US); Shannon Walsh, Boston, MA (US); Frank Chiang, Boston, MA (US); Janet Muto, Boston, MA (US); Nitzan Shaer, Newton, MA (US); Hannah Sieber, Mendon, MA (US); Charlie Hoang, Boston, MA (US); Alexa Stewart, Andover, MA (US); Keith Horvath, San Diego, CA (US); Marshall McCready, Dallas, TX (US); Laurie Delaney, Dedham, MA (US); Jon Andrews, Boston, MA (US)

(73) Assignee: Wevo, Inc., Boston, MA (US)

( * ) Notice: Subject to any disclaimer, the term of this patent is extended or adjusted under 35 U.S.C. 154(b) by 0 days.

(21) Appl. No.: 18/111,444

(22) Filed: Feb. 17, 2023

(51) Int. Cl.
  *G06Q 30/018* (2023.01)
  *G06F 9/451* (2018.01)

(52) U.S. Cl.
  CPC ......... *G06Q 30/0185* (2013.01); *G06F 9/451* (2018.02)

(58) Field of Classification Search
  CPC ......... G06Q 30/0185; G06Q 10/06395; G06Q 10/00; G06Q 10/02; G06Q 10/06; G06Q 10/10; G06Q 30/02; G06Q 30/0203; G06Q 30/0283; G06Q 30/0245; G06F 9/451;
  (Continued)

(56) References Cited

U.S. PATENT DOCUMENTS

| 9,336,494 B1 * | 5/2016 | Purpura ................. G06N 20/00 |
| 11,348,148 B2 | 5/2022 | Mestres et al. |
| 2002/0128898 A1 | 9/2002 | Smith et al. |

(Continued)

FOREIGN PATENT DOCUMENTS

| WO | 02/63435 A2 | 8/2002 |
| WO | 2022/183218 A1 | 9/2022 |

OTHER PUBLICATIONS

Batch et al., uxSense: Supporting User Experience Analysis with Visualization and Computer Vision, Jan. 31, 2023, IEEE Transactions on Visualization and Computer Graphics, Issue 99, pp. 1-15 (Year: 2023).*

*Primary Examiner* — Robert D Rines
(74) *Attorney, Agent, or Firm* — Invoke

(57) ABSTRACT

Techniques and embodiments are described herein for detecting and mitigating fraudulent activity within user experience (UX) test applications. In some embodiments, a system applies a set of rules and/or machine learning (ML) models to each respondent of an online survey or UX test. Different ML models may be trained to learn domain-specific patterns indicative of fraudulent activity. The system may then select the ML models based on attributes of the UX test and/or respondent. The selected rules and/or ML models may generate a probabilistic score representing a likelihood that the respondent is currently engaging in or will engage in fraudulent activity with respect to a UX test. If the score exceeds a threshold, then the system may take action to mitigate the fraudulent activity, such as triggering the removal of the user from an accepted respondent pool, halting further engagement between the respondent and the UX test, and generating alerts.

20 Claims, 9 Drawing Sheets

(58) Field of Classification Search
CPC ...... G06F 11/3438; G05B 2219/31357; G06N 5/04; G06N 20/00
See application file for complete search history.

(56) References Cited

U.S. PATENT DOCUMENTS

| | | | | |
|---|---|---|---|---|
| 2015/0379429 | A1* | 12/2015 | Lee | G09B 5/00 |
| | | | | 706/11 |
| 2016/0277527 | A1* | 9/2016 | Wang | H04L 67/306 |
| 2018/0018737 | A1* | 1/2018 | Drucker | G06Q 40/08 |
| 2018/0218283 | A1* | 8/2018 | Jenson | G06Q 50/01 |
| 2019/0182059 | A1* | 6/2019 | Abdou | H04L 51/52 |
| 2019/0205838 | A1* | 7/2019 | Fang | G06Q 10/06398 |
| 2019/0324896 | A1* | 10/2019 | Ziaee | G06F 11/3684 |
| 2020/0074294 | A1 | 3/2020 | Long et al. | |
| 2020/0125586 | A1* | 4/2020 | Rezaeian | G06F 3/048 |
| 2020/0327506 | A1* | 10/2020 | Litman | G06Q 10/1053 |
| 2021/0192609 | A1* | 6/2021 | Walsh | G06N 20/00 |
| 2021/0201179 | A1* | 7/2021 | Sghiouer | G06N 20/00 |
| 2021/0304232 | A1 | 9/2021 | Litman et al. | |
| 2021/0319527 | A1* | 10/2021 | Benkreira | H04W 12/66 |
| 2021/0374778 | A1* | 12/2021 | Schlick | G06Q 30/0201 |
| 2022/0253856 | A1* | 8/2022 | Wong | G06N 3/088 |
| 2022/0300364 | A1* | 9/2022 | Nagaraddi | G06N 3/08 |
| 2022/0383346 | A1 | 12/2022 | Barreto et al. | |
| 2023/0187813 | A1* | 6/2023 | Mestres | G06F 11/3438 |
| | | | | 257/728 |
| 2023/0401591 | A1* | 12/2023 | Janani | G06Q 30/0201 |

* cited by examiner

Fielding/Panel Manager/Dash

| Qualtrics Name | Mobile CORE V1 |
|---|---|
| Qualtrics Survey | SV_022412 |

Expand Test Details

Model-Based Auto-Curation Paused ▶ ⏸ — 702

| Select | Model Recommendation | Respondent ID | Accept Score | Responses | | Reject |
|---|---|---|---|---|---|---|
| | | | | Expand All Response Sets | | |
| | | | | Question ID | Question Text | Response |
| ☐ | Reject | ZK2412 | 0.36 | TXT_Imp | What specifically about the page made you feel this way? | It was very good to understand about it |
| | | | | TXT_Like | Why did you select this area? | The search was not good enough |
| | | | | TXT_Int | What about this page made it easy to understand? | The survey was very good to understand about it |
| | | | | TXT_Tr | What about this page helps you trust this continuing education course? | Because the survey was very good to understand about it |
| | | | | Expand Response Set | | |
| ☐ | Accept | PT0410 | 0.25 | TXT_Imp | What specifically about the page made you feel this way? | Powerful and direct representation of product, delightful layout of user interface |
| | | | | TXT_Sent | What emotions best describe your reaction to his page? | Capable, Useful |
| | | | | TXT_Like | Why did you select this area? | Writing too small |
| | | | | TXT_Con | In a full sentence, please explain how this page addressed your concern? | It's obvious |
| | | | | Expand Response Set | | |

SCALABLE SYSTEM AND METHODS FOR CURATING USER EXPERIENCE TEST RESPONDENTS

TECHNICAL FIELD

The present disclosure relates, generally, to user experience testing. In particular, the present disclosure relates to the integration, optimization, and scaling of panel service providers within user experience test systems.

BACKGROUND

User experience (UX) design encompasses tools and applications for optimizing how users interact with a system, which may be comprised of physical and/or digital interfaces. Example tools used by UX researchers include surveys, which may be administered online to users of a product or service. Survey results may include qualitative and quantitative data that provide insights into various facets of user experiences with the product or service. Such insights may help isolate areas of the product or service that are underperforming and what design changes are most likely to improve the user experience.

Panel providers enable online surveys to be administered to target audiences that user experience researchers may otherwise be unable to reach. A panel provider is an online service that manages a source of panelists and may select qualified panelists as respondents to an online survey or UX test. Each panel provider may leverage proprietary tools and methods for maintaining a panelist pool. Panel providers are useful sources of high-quality respondents that may enhance the results of surveys administered online.

The scale of administering surveys online is often constrained by a tight coupling of the survey to the panel provider. Each panel provider has different application programming interfaces (APIs), schemas, and methods for maintaining panelists. Thus, for a survey to work with a specific panel, the survey is generally configured to include an appropriate instance of the code for invoking the panel-specific APIs and schemas. This approach enables survey-based research to initiate with a panel provider. However, it has limited ability to scale. If there is a change in panel providers, then the survey code must be updated to accommodate the different panel-specific APIs and schemas. Modifying the survey code is often a cumbersome and time-intensive task.

Another challenge with administering surveys involves detecting and preventing fraud. Intentional fraud may occur where a respondent is not engaging with a survey with the explicit purpose of being paid for nothing. For example, a respondent may use a software application configured to provide automated responses to the online survey questions. Unintentional fraud may occur if the respondent provides a survey with little or no value for other reasons. Some causes may include the respondent having a limited capacity or attention span to provide meaningful answers to the survey questions. Panel providers may help protect against fraudulent respondents by maintaining a high-quality pool of panelists. However, a panel provider may not be able to filter out all fraudulent activity, and the panel provider may have limited insight into the quality of survey results from the respondents that the panel provider has directed to an online survey.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 7 illustrates a user interface for providing input for controlling and tuning machine learning model parameters in accordance with some embodiments;

DETAILED DESCRIPTION

Figure 1:
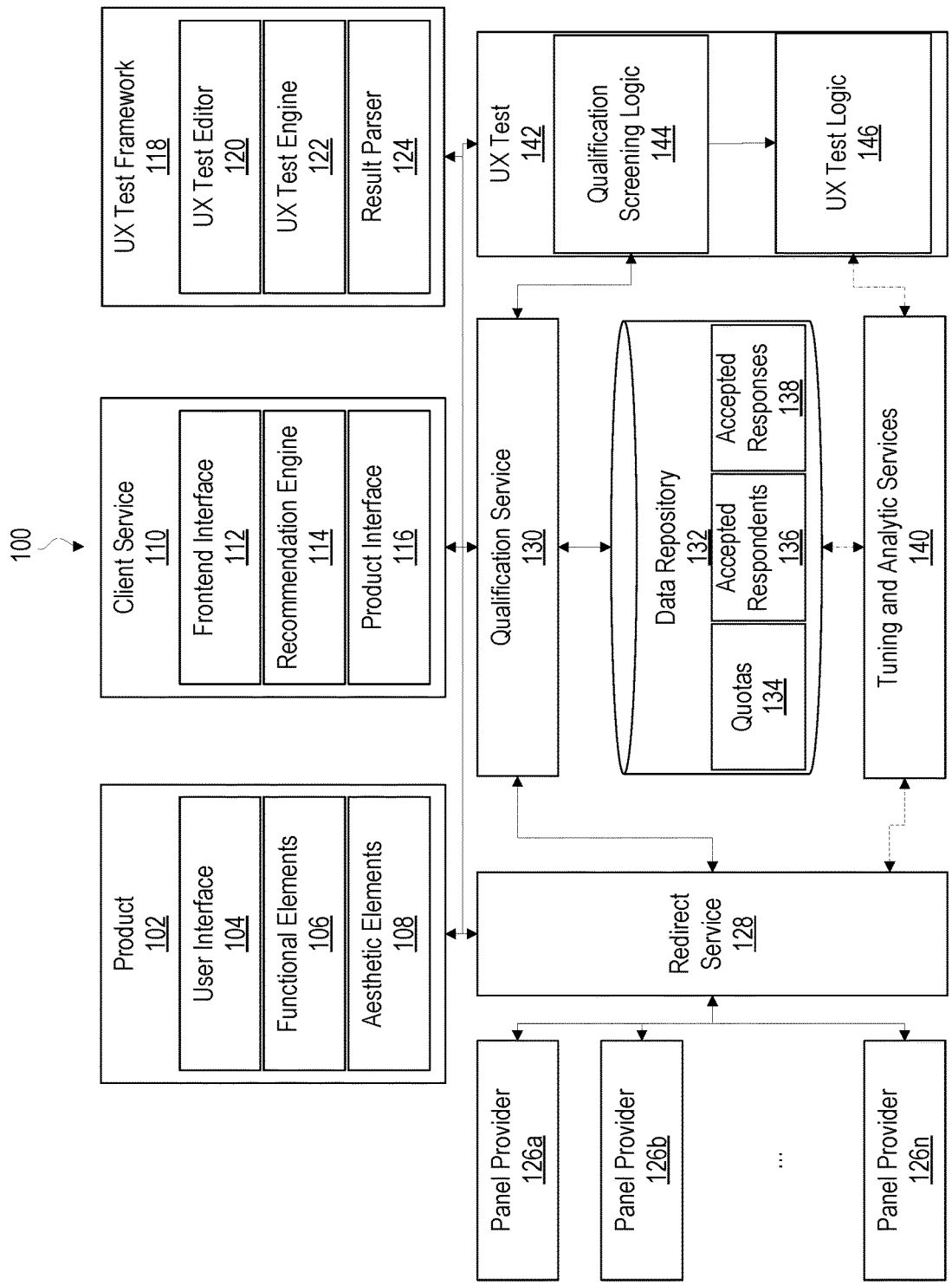
FIG. 1 illustrates a scalable system architecture for parallelizing requests to run user experience tests across multiple panel providers in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

Techniques and embodiments described herein include a scalable system for integrating panel-based research with user experience (UX) testing tools, such as online survey applications. The techniques provide for the parallelization of a single request across multiple panel providers. The parallelization across multiple panel providers may occur transparently to users, including the designers of UX testing tools and methodologies, without requiring any complex modifications of the underlying source code. The parallelization may further significantly reduce request processing speeds within the system. Qualified UX test respondents may be fielded much more quickly, increasing system scalability by allowing the system to process more requests within a given timeframe.

Techniques and embodiments may further increase scalability by efficiently fielding UX test respondents through feedback mechanisms. The feedback mechanisms may include synchronous and asynchronous processes that tune the system's fielding of respondents during runtime of a survey or other UX test. With synchronous processing, feedback and tuning are synchronized with the timing of a respondent's experience. Thus, tuning may happen near instantaneously with respondent inputs at one or more stages or the respondent's experience. With asynchronous processing, feedback and tuning are decoupled from the timing of a respondent's experience. Asynchronous processing may be executed as part of a separate flow for more process-intensive tasks, which may minimize wait times within the system.

Techniques and embodiments are further described herein for detecting and mitigating fraudulent activity within the system. The system may apply a set of rules and/or machine learning (ML) models to each respondent of an online survey or other UX test. In some embodiments, different models are trained to learn domain-specific patterns indicative of fraudulent activity. The system may then select the ML models based on attributes of the UX test and/or respondent. The selected rules and/or ML models may generate a probabilistic score representing a likelihood that the respondent is currently engaging in or will engage in fraudulent activity with respect to a UX test. If the score exceeds a threshold, then the system may take appropriate action to mitigate the suspected fraudulent activity, such as triggering the removal of the user from the accepted respondent pool, halting further UX test processing if the respondent has engaged with the UX test, supplying panel notifications to provide feedback to panel providers, and generating alerts to notify system administrators.

In some embodiments, the system allows the ML-based fraud detection to be paused and/or disabled. Providing a mechanism for pausing the ML-based subsystem allows operators to determine whether to take a more automated or hands-on approach, which may make the delivery of results more predictable. Further, a mechanism to stop runaway automation may enhance system resilience by mitigating negative effects in scenarios when the ML model predictions flag respondent activity too frequently. Respondent rejections may have a material impact on various facets of a panel provider's operations, including revenue, performance analyses, and selection methodologies. If such a case arises, the operator may pause or otherwise disable the model-based system, falling back to a more predictable rules-based approach. When paused, the ML-based system may still be applied to decorate respondents with model recommendations for subsequent operator consideration.

One or more embodiments described in this Specification and/or recited in the claims may not be included in this General Overview section.

2. System for Parallelizing Respondent Fielding

Embodiments herein include a system for parallelizing respondent fielding across multiple panel providers for integration with UX testing applications. In some embodiments, the UX testing applications include surveys that are administered to current, former or prospective users of a product or service. A survey may be implemented as a program or software application that includes prompts to receive user input and code for integrating the application with a panel. For example, a survey may include code for facilitating a handshake with a panel provider, code for communicating to external services that a particular user has started the survey, and code for managing the survey state. The code may invoke panel-specific application programming interfaces (APIs) to execute one or more of these functions. However, as previously indicated, creating a survey with panel-specific code causes the survey to be tightly coupled a single panel provider, negatively affecting system scalability, including the ability to parallelize the survey across multiple panel providers.

In some embodiments, a survey includes code for integrating with a redirect service that intercepts panel provider respondents. The redirect service may create a new, normalized respondent record for consumption by the survey code. The normalized record may conform to a panel-agnostic format such that the survey code may operate on normalized records for respondents, regardless of which panel provider is the source of the respondent. The normalization process may be executed transparently by the redirect service with respect to the survey code. Thus, the survey may be created without requiring any panel-specific code. If there is a change in panel provider when administering the survey, the survey may be run from the same source code without any changes. Additionally, the system may concurrently run the same survey across multiple panel service providers.

While many example provided herein relate directly to UX tests, many of the embodiments may be applied to other types of online surveys or test applications for which respondents are required to be fielded. For instance, the techniques may be applied to parallelize respondent fielding for online polling surveys, online educational tests, and/or other applications.

FIG. 1 illustrates a scalable system architecture for parallelizing requests to run UX tests across multiple panel providers in accordance with some embodiments. As illustrated in FIG. 1, system 100 includes product 102, client service 110, UX test framework 118, panel providers 126a-n, redirect service 128, qualification service 130, UX test 142, tuning and analytic services 140, and data repository 132. In some embodiments, system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Product 102 refers to an item or service with which users may interact. Examples include articles of manufacture, software applications, cloud computing services, websites, virtual assistants, and other computing-based systems. Product 102 includes user interface 104 for interacting with one or more users. In the context of a computing system, service, or application, user interface 104 may render user interface elements and receive input via user interface elements. Example user interfaces include a graphical user interface (GUI), a command line interface (CLI), a haptic interface, and a voice command interface. Example user interface elements include checkboxes, radio buttons, dropdown lists, list boxes, buttons, toggles, text fields, date and time selectors, command lines, sliders, pages, and forms. User interfaces for other types of products may include buttons, levers, knobs, dials, and/or other physical elements through which a user may manipulate and interact with product 102.

In some embodiments, product 102 includes functional elements 106 and aesthetic elements 108, which may impact the user experience with respect to product 102. Functional elements 106 may include user interface controls through which the user may operate product 102 and/or control the output of product 102. Functional elements 106 may further comprise backend processes and/or systems with which a user does not directly interact, but which may affect a user's experience with product 102, such as a perceived responsiveness or quality of product 102. Aesthetic elements 108 may generally comprise nonfunctional components of product 102 including the look and feel of user interface 104 and/or other visual design elements of product 102.

UX test framework 118 includes components for composing and running UX tests. The components may include UX test editor 120, UX test engine 122, and result parser 124. A UX test may comprise applications, tools, and/or processes for evaluating the performance of various facets of one or more user experiences with product 102. For example, a UX test may comprise a survey or questionnaire. Users of a website or a mobile application may be prompted to complete the UX test to evaluate their experience with product 102, which may be the website or application itself or a separate product. If the user accepts the prompt, the user may be redirected to a webpage with a set of queries to describe and/or rank various facets of the user experience with product 102.

Additionally or alternatively, a UX test may obtain performance data for one or more UX facets using mechanisms for tracking how a user interacts with product 102. For example, scripting tags that embed executable code in a website or backend processes, such as daemons, may track and collect metrics and/or other information about user interactions with product 102. Example metrics may include how long it takes a user to first interact with a user interface element, how long it takes a user to complete a function, how long a user engages with product 102, how long it takes for pages of user interface 104 to load, which products features are most frequently accessed, and which product features are least frequently accessed. A UX test may assign scores based on the extracted information using a scoring function or machine learning, where a UX test score quantifies one or more user experiences with respect to one or more facets of the user experience. Although only one product is illustrated in FIG. 1, a given UX test may be run for several different products and several different UX tests may be run for the same product.

UX test editor 120 is a tool through which users may compose and customize UX tests. For example, UX test editor 120 may include one or more GUI elements through which a user may select predefined survey questions, input new questions, define scripts for capturing performance metrics, and/or otherwise customize test applications to evaluate user experiences with product 102. UX test editor 120 may further allow users to define parameters associated with running a UX test, such as what segment to target, what platform to use running the test, and/or other parameters controlling how the UX test is run. Additionally or alternatively, users may select which panel provider services to use when fielding respondents for a UX test. In other cases, the panel provider services may be selected automatically based on factors including quality metrics, which may be determined based on the feedback mechanisms described below.

UX test engine 122 runs tests defined through UX test editor 120. A UX test may include a query mechanism to prompt or search for data describing or quantifying one or more facets of a user experience. For example, UX test engine 122 may prompt a sample set of visitors to a webpage to complete a survey describing and/or ranking various facets of a user experience with product 102. As another example, UX test engine 122 may capture webpage usage metrics from the set of visitors using scripting tags and/or scrape review sites for information describing product 102, as previously described. The tests may be run in accordance with the parameters input through UX test editor 120. The results of a UX test may include qualitative elements describing the user experience and/or quantitative elements that quantify the user experience.

Result parser 124 parses the results of UX tests to extract actionable insights with respect to product 102. For example, result parser 124 may parse the results to determine which areas of the product design have higher and/or lower quantitative scores than peer products in the same category or industry. Result parser 124 may compare various facets of the user experience with product 102 to industry benchmarks to indicate which areas would most likely benefit from design modifications. Additionally or alternatively, result parser 124 may present and/or implement recommended changes to the product based on the UX test results.

Panel providers 126a-n are online services that are sources of targeted respondents for UX tests and/or online surveys. The set of panel providers 126a-n may include different third-party services that each implement their own proprietary tools and methods for maintaining a panelist pool. A panelist pool includes a set of candidate respondents to target for a given UX test. In many cases, candidate respondents are remunerated or otherwise compensated for test that are successfully completed. A panel provider may also be compensated based on the number of respondents successfully supplied. Panel providers generally strive to maintain a pool of high quality respondents to reduce wasting resources, maintain positive relationships with service subscribers, and maximize compensation.

Panel providers 126a-n may expose APIs for accessing and integrating panels with UX testing applications and surveys. In some embodiments, an UX test application may invoke an API to specify quotas for targeted respondents, where a quota represents a distribution of respondents with varying sets of attributes. For example, a UX test application may target thirty percent of respondents in a first age range, thirty percent in a second age range, and forty percent in a third age range. As another example, a UX test application may target a fifty-fifty split between male and female respondents. The attributes used to group respondents and the number of groups may vary from application to application.

Additionally or alternatively, panel providers 126a-n may expose other APIs, which may be invoked during runtime of a UX test application. For example, an API may be invoked to notify the panel providers of a current respondent status, such as if the respondent has been accepted or rejected. The notification may provide a reason if the respondent is rejected. As another example, an API may be invoked to access panel metadata that includes information about a respondent, such as age, occupation, education, income, sex, online activity, interests, etc. The information may be used to generate normalized respondent records, which conform to a patent-agnostic format. In yet another example, an API may be invoked to provide a uniform resource locator (URL) for accessing the UX test. A panel provider may use the URL to generate and present panel-specific links to target respondents that are members of the pool managed by the panel provider.

Leveraging multiple panel providers 126a-n to field respondents in parallel may allow UX tests to be run much more quickly, as it may take a single panel provider days or even longer depending on the size of the quota. One challenge, however, is that an individual panel provider is not aware of the operations of another panel provider, including how many respondents other panel providers have fielded and the current state of these respondents. Synchronous and asynchronous processes may dynamically provide feedback, during UX test runtime, to individual panel providers without compromising the anonymity of the panel providers. For example, the feedback may be used to adjust quotas and/or the rates at which a panel provider fields candidate respondents with varying sets of attributes. Example synchronous and asynchronous feedback processes are described further in the sections below.

Redirect service 128 intercepts candidate respondents that select panel-specific links to take an online survey or UX test. The redirect service may create a new, normalized respondent record for consumption by the survey or UX test code. The normalized record may conform to a panel-agnostic format such that the survey code may operate on normalized records for respondents, regardless of which of panel providers 126*a-n* is the source of the respondent. The normalization process may be executed transparently by the redirect service with respect to the survey or UX test code. Thus, UX tests may be created, modified, and deployed without requiring any panel-specific code to be written or panel-specific APIs to be invoked. If there is a change in the set of panel providers when administering the UX test, the test may be run from the same source code without any changes. Redirect service 128 may include a set of parallel servers and/or process for managing candidate respondents that concurrently hit links to instances of the UX test application.

Qualification service 130 performs functions for determining whether candidate respondents are qualified. Qualification service 130 may remove candidate respondents from an accepted respondent pool or prevent the respondents from being added to the pool if the respondents do not satisfy a set of qualification criteria. The qualification criteria may be based on the defined respondent quotas. Additionally or alternatively, the qualification criteria may account for other factors, such as a candidate respondent's metadata attributes, a respondent's online behavior during the test, and a candidate respondent's answers to qualification questions.

If a candidate respondent passes satisfies initial qualification screening, then an instance of UX test 142 may be launched, and the candidate respondent may be redirected seamlessly from selecting the link to taking the test. If the respondent is not qualified, then a notification may be presented to the candidate respondent upon selecting the link, through a GUI of the browser or client application used to select the link, that the candidate respondent has not been accepted.

In some embodiments, UX test 142 includes qualification screening logic 144 to perform additional qualification tests regarding the candidate respondent. For example, qualification screening logic 144 may prompt the user to answer questions to confirm that the user satisfies qualification criteria that was not able to be determined from the information provided by the panel provider and/or to confirm that the information is accurate. The qualification questions presented by qualification screening logic 144 may vary depending on which panel provider is the source of the candidate respondent, how the quotas have been defined for a UX test, and/or custom criteria defined by a UX test administrator or other user. Qualification screening logic 144 may account for information that varies from one panel provider to another. In some cases, the differences may relate to the resolution of the information provided. For example, one panel provider may specify a ten year age range for a candidate respondent, and another panel provider may specify a five year age range. If the quota relies on a five year age range to cluster respondents into groups, then qualification screening logic 144 may prompt candidate respondents redirected from the lower resolution panel provider's link with specific questions about age. The same prompt may be omitted for candidate respondents from the other panel provider. In other cases, certain information may be wholly lacking from a panel provider. For instance, a qualification question may query what color car a user drives if lacking in the normalized record and/or any other set of attributes that are pertinent to how candidate respondents are selected and clustered for a given test.

UX test logic 146 includes the application code and date for running a UX test. For example, UX test logic 146 may define survey questions and GUI controls for submitting responses. As another example, UX test logic 146 may include code for presenting a prototype of a product to a respondent and/or tracking interactions between the user and the product.

Tuning and analytic services 140 provides real-time analysis and adjustments to optimize system performance. In some embodiments, tuning and analytic services 140 updates quotas and/or configuration settings to dynamically change the rates at which respondents having certain attributes are fielded. For instance, a survey may target 50 percent of respondents sharing a first attribute (or set of attributes) and 50 percent of respondents sharing a second attribute (or set of attributes). In some cases, the balance of respondents may skew in one direction or the other, especially if the number of respondents that are accepted in one group is higher than another. If the number of fielded respondents begins to skew in one direction, tuning and analytic services 140 may update configuration settings within redirect service 128 to adjust the rates at which respondents are fielded in each group. Tuning during application runtime may reduce the amount of time a UX test is left waiting to fulfill defined quotas, allowing for faster execution times.

Additionally or alternatively, turning and analytic services 140 may asynchronously assess the quality of UX test results, such as survey responses and/or other respondent test inputs. If a user completes a UX test, the asynchronous process may retroactively remove the respondent from an accepted respondent pool if the quality of the UX test results are below a threshold quality. Low quality and fraudulent test results may not be helpful in assessing the performance of product 102. For example, a user may copy and paste the same answer to each response in a survey, which conveys little to no useful information. Tuning and analytic services 140 may assess the quality of the UX test results using natural language processing, machine learning, and/or other approaches. The results of the assessment may be used to optimize respondent fielding, such as by adjusting the rates at which panel providers 126*a-n* and/or redirect service 128 field respondents. Additionally or alternatively, the feedback may be used to perform other actions, such as detecting and preventing fraudulent behavior within system 100, denying compensation to panel providers and respondents for low-quality test results, and training ML models.

Data repository 132 stores and fetches data including quotas 134, accepted respondents 136, and accepted responses 138. Quotas 134 includes data specifying the number and distribution of target respondents for completing a test. For example, a quota may define a total number of respondents to field, a set of qualification criteria for one or more groups of respondents that are targeted, and a percentage share or count of different groups of respondents required to complete a test. Quotas 134 may track the remaining number of respondents required to complete a test based on accepted respondents 136 and/or accepted responses 138. The rate at which parallel processes field respondents may be set and updated based on the quotas defined for a UX test.

In some embodiments, data repository 132 is any type of storage unit and/or device (e.g., a file system, database, collection of tables, or any other storage mechanism) for storing data. Further, data repository 132 may include multiple different storage units and/or devices. The multiple different storage units and/or devices may or may not be of the same type or located at the same physical site. Further, data repository 132 may be implemented or executed on the same computing system as one or more other components of system architecture 100. Alternatively or additionally, data repository 132 may be implemented or executed on a computing system separate from one or more other system components. Data repository 132 may be communicatively coupled to remote components via a direct connection or via a network.

Client service 110 may comprise applications, tools and systems used by product designers and/or third-party service providers that run specialized UX tests. In some embodiments, client service 110 comprises frontend interface 112, recommendation engine 114, and product interface 116. Frontend interface 112 may comprise a user interface for presenting analytics, recommended actions, and/or other information based on the predictions. For example, frontend interface 112 may generate and render interactive charts that allow a user to compare predicted UX test scores for product 102 to performance benchmarks and view the most relevant test themes and representative test responses. The user may view which facets are underperforming relative to peer products, the most informative UX test results indicative of why the facets are underperforming, and recommended actions to address the problems.

Recommendation engine 114 may comprise logic for generating recommendations. For example, recommendation engine 114 may determine which facets are underperforming and which solutions are predicted to improve performance with respect to the facet. Recommendation engine 114 may leverage analytics and/or machine learning to generate the recommendations. For instance, recommendation engine 114 may learn patterns within accepted UX test result data for various products. Recommendation engine 114 may apply a trained model to recommend product updates that are predicted to improve the product's benchmark scores.

Product interface 116 may be communicatively coupled to product 102 and allow client service 110 to invoke and/or execute functions on product 102. For example, product interface 116 may include an API endpoint for sending requests to a software application or a service to execute a requested change in the user interface. As another example, product interface 116 may invoke an editor to change a webpage associated with product 102. The requests and functions that are invoked may be directed to improving underperforming facets of product 102.

The components illustrated in FIG. 1 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

One or more components illustrated in FIG. 1, may be implemented as a cloud service or a microservice application. Tenants may subscribe to a cloud service to define UX tests or surveys, field respondents for a UX test using parallel processes across multiple panel providers, track UX benchmark scores of a product, view the most helpful qualitative data highlighting the product design features that excelled or underperformed, and/or implement recommended actions to improve the product design. Additional embodiments and examples relating to computer networks are described below in Section 9, titled Computer Networks and Cloud Networks. Additional embodiments and examples relating to computer networks are described below in Section 10, titled Microservice Applications.

3. Synchronous Respondent Fielding and Feedback Processes

System 100 may execute one or more synchronous processes for fielding responses and providing feedback. During program runtime, parallel redirect processes may field multiple respondents across different panel providers. As previously noted, the operations of one panel provider may be opaque to other panel providers in the system. In particular, a panel provider may not be able to access sensitive data about what other panel providers are serving as sources of respondents, how many respondents were successfully fielded by the other panel providers, what the distribution of the respondents are from the other panel providers, and how much compensation other panel providers are receiving. The synchronization processes may coordinate operations across various panel providers and update panel-specific configuration settings to optimize runtime performance of the UX test applications. The feedback and updates may be performed without exposing the sensitive data of one panel provider to another panel provider.

In some embodiments, a synchronous process provides feedback based on the timing of an individual respondent's experience. The respondent's experience in this context may comprise a set of one or more processes that are blocked at numerous stages of execution. For example, when a respondent first selects a link, the process of opening the corresponding resource (e.g., the online survey or UX test identified by the URL) may be blocked by the redirect service 128 until the service successfully verifies the respondent satisfies a set of redirection criteria. At another stage, qualification service may block the process from proceeding until the respondent successfully answers a set of qualification questions. At other stages, the UX test may be terminated if the user prematurely quits or a timeout value is reached. At each of these stages, the respondent may be rejected or removed from an accepted respondent pool, or, conversely, the UX test application may proceed to the next stage. A synchronous process may provide feedback at these stages, which may be used to adjust configuration settings, including redirect configuration settings and/or panel-specific configuration settings.

At any given instant, several different instances of a program may be running for different respondents. Synchronous processes may be instantiated to handle processing for each respondent in the system in a manner that is performant, such that processing is executed transparently with minimal latency from the perspective of a candidate respondent that has selected a link to start a UX test. Further, synchronous processes may provide feedback in real-time or near real-time as the various stages, including the example stages previously mentioned, which allows for the system to be tuned based on the current system state.

Figure 2:
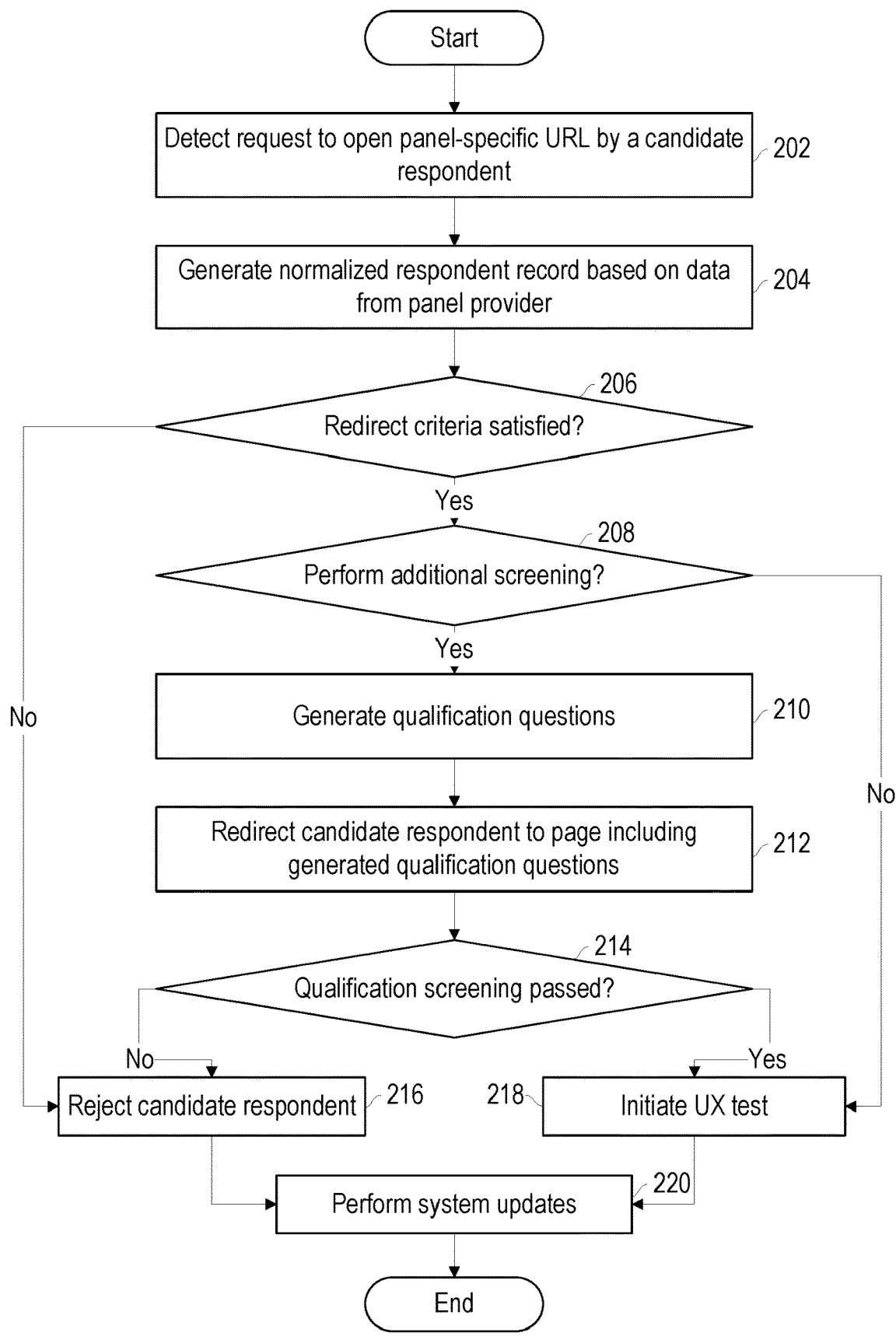
FIG. 2 illustrates an example synchronous process for fielding candidate respondents in accordance with some embodiments.

FIG. 2 illustrates an example synchronous process for fielding candidate respondents in accordance with some embodiments. One or more operations illustrated in FIG. 2 may be modified, rearranged, or omitted all together. Accordingly, the particular sequence of operations illustrated in FIG. 2 should not be construed as limiting the scope of one or more embodiments.

At operation 202, redirect service 128 detects a request to open a panel-specific URL by a candidate respondent. In some embodiments, panel providers present the panel-specific URL to members of a pool of panelists that satisfy a set of criteria for engaging with the test. Members of the panel that do not satisfy the set of criteria are not provided with the panel-specific URL to access the UX test. For example, a UX test may target 70% respondents with a target age bracket from 25 to 50 and 30% respondents older than 50 years of age. The panel provider may generate and present links to members of the panel pool that fall within the target groups. The rate at which a panel serves links to members of a panel pool may correspond to the specified percentages (e.g., members in the first target age bracket are served links 70% more frequently than respondents in the second age range). The candidate respondents may view and select the panel-provided link through a GUI of a client application, such as a browser or mobile app.

When a candidate respondent selects a link, redirect service 128 may detect and intercept the request to open the panel-specific URL. At operation 204, redirect service 128 generates a normalized respondent record based on data from the panel provider. Redirect service 128 may generated normalized records by translating data in a panel-specific format to a panel-agnostic format. The panel-specific format may vary depending on the panel provider service that is the source of a candidate respondent. For example, different panel providers may provide data using different file types, structures, and APIs. Redirect service 128 may convert the data from the different formats to the normalized format. The format may be defined using a structured markup language, such as the extensible markup language (XML) or JavaScript Object Notation (JSON). The normalized, panel-agnostic file format may be consumed by UX test applications, including surveys, without requiring the test application to integrate any panel-specific references or APIs into its source code.

Different panel providers may further provide different sets of data for panelists and/or provide data at different resolutions. For instance, one panel provider may collect and provide data identifying online services to which a candidate respondent is subscribed while another panel provider may not include this information. As another example, one panel provider may provide age information at a higher resolution than another panel provider, such as within a ten-year age range versus a five-year age range. Redirect service 128 may normalize the data to a standard set of attributes and resolutions. If information is not available from a given provider, then the normalized record may include an entry indicating the attribute value is unknown.

At operation 206, redirect service 128 determines if a set of redirect criteria is satisfied. In some embodiments, redirect service 128 compares the normalized respondent data with the specified quotas for the UX test. If a quota is filled or the candidate respondent is not part of a targeted group, then at operation 216, redirect service 128 rejects the candidate respondent.

Additionally or alternatively, redirect service 128 may analyze other factors when determining if the redirect criteria is satisfied. For example, redirect service 128 may analyze information associated with the candidate respondent and reject the respondent if the respondent has already completed the survey or has a history of engaging in fraudulent behavior. Some respondents may belong to different panel provider pools, and redirect service 128 may filter out duplicates. For instance, redirect services 128 may analyze the internet protocol (IP) address of the network host that opened the panel-specific link, the email address used by the candidate respondent to join a panel provider, the media access control (MAC) assigned to the network interface controller of the machine used by the candidate respondent to engage with the test, and/or other attributes indicative of the respondent's identity to determine whether the respondent is a duplicate. Machine learning may be used to compute a probabilistic score that a user has already completed a UX test and, if so, redirect service 128 may reject the candidate respondent.

If the candidate respondent satisfies the set of redirect criteria, then, at operation 208, qualification service 130 determines whether to perform additional screening. In some embodiments, qualification service 130 may analyze the normalized record for the candidate respondent to determine whether the record lacks information required to determine if the candidate respondent satisfies a set of qualification criteria for taking the UX test or survey. If so, then qualification service 130 may perform additional screening to extract the information. Additionally or alternatively, qualification service 130 may perform additional screening to confirm attributes within the normalized record, such as age and/or other demographic information.

If additional screening is to be performed, then at operation 210, qualification service 130 generates a set of qualification questions to extract the missing information and/or confirm that the candidate respondent is qualified to take the UX test or survey. In some embodiments, qualification service 130 generates a GUI, such as a webpage or application page, that includes the set of questions and GUI elements for responding to the questions.

As previously noted, the qualification records that are generated may vary depending on the normalized record and/or panel provider that is the source of the respondent. For example, redirect service 128 may generate a first normalized record for a first candidate respondent that has selected a first panel-specific link and a second normalized record for a second candidate respondent that has selected a second panel-specific link. Redirect service 128 may generate the first normalized record from a first set of data that follows a first panel-specific format associated with a first panel provider and the second normalized record from a second set of data that follows a different panel-specific format associated with a second panel provider. Qualification service 130 may then determine a first set of qualification questions to present to the first candidate respondent based the information that is missing in the first normalized record and a second set of qualification questions to present to the second candidate respondent based on information that is missing from second normalized record. Due to the differences in the records, the first set of qualification questions may be different than the second set of qualification questions.

At operation 212, redirect service 128 redirects the candidate respondent to the page including the generated qualification questions. The redirect operations may be performed transparently with minimal latency responsive to the respondent's selection of the panel-specific hyperlink. Thus, from the perspective of the candidate respondent, when the candidate clicks the link, the page (e.g., webpage, page in a mobile app, etc.) is loaded and rendered by the client application used to select the link. If no additional qualification screening is needed, then redirect service 128 may initiate an instance of the UX test or survey at operation 218 and redirect the candidate respondent to a page associated with the testing application. In this case, from the candidate respondent's perspective, selecting the link directly results in loading the UX test instance. The respondent may be unaware of the redirect and qualification processes executing transparently behind the scenes.

At operation 214, qualification service 130 determines whether the qualification screening is passed. For example, qualification service 130 may compare the answers input by the candidate through the application page with the quotas and/or other qualification criteria to determine whether the criteria are satisfied. If the candidate does not satisfy the criteria (e.g., the candidate respondent is not part of an unfilled quota or has provided low quality answers), then qualification service 130 may reject the candidate respondent at operation 216.

At operation 216, when the candidate respondent is rejected, the respondent is blocked or, if previously added, removed from the set of accepted respondents 136. Redirect service 128 may send a notification to the source panel provider about the rejection including the reasons the candidate was rejected. For instance, the notification may indicate which qualification criteria were not satisfied and/or which answers to qualification questions were responsible for the rejection. The panel may use the feedback to improve the quality of the pool of panelists. The candidate respondent may further be presented with a notification regarding the rejection. The notification message may be presented in the browser or other client application responsive to the user selecting the panel-specific link or responsive to the user submitting the answers to the qualification questions. Once a candidate respondent is rejected, system 100 blocks the respondent from completing an instance of the UX test. If an instance of the UX test has already been initiated on behalf of the candidate respondent, then system 100 may terminate the application instance.

If the candidate respondent has qualified to take the UX test or survey, then, at operation 218, UX test engine 122 may initiate an instance of the test. The test may be loaded in the client application used by the respondent. For example, an online survey may be rendered within the respondent's browser application, allowing the user to navigate, select, and input responses to survey questions. As another example, a UX test may be launched that tests the usability of a product prototype. The UX test may monitor and track user interactions with the product, as previously described, to assess various facets of the respondent's experience.

At operation 220, redirect service 128 performs one or more system updates based on the synchronized feedback. For example, system 100 may update the quotas, accepted respondent pool, and/or the normalized record for the respondent based on whether the respondent was accepted or rejected.

In some embodiments, system 100 may perform panel-specific configuration updates at operation 220. An example configuration update is to notify all panels that a test no longer requires respondents with a specific attribute since the quota has been filled. In this case, the rate of fielding respondents with the specific attribute may drop to zero while the panels continue to field respondents having attributes satisfying other unfilled quotas. Additionally or alternatively, the configuration settings of redirect service 128 and/or qualification service 130 may be updated based on the feedback to adjust how respondents are fielded. For instance, redirect service 128 may be reconfigured to block respondents having the specific attribute if the quota is filled. If redirect service 128 is unable to determine if the candidate has the specific attribute, then qualification service 130 may be configured to query the respondent about the attribute and remove the respondent if the respondent has the specific attribute. Additional examples of how feedback may be used to tune respondent fielding are described further below in Section 5, titled Configuration Updates and Performance Tuning.

4. Asynchronous Processing and Feedback

As previously mentioned, the flow associated with the synchronous processes is designed to be performant. As a result, wait times for the individual respondents may be minimized, which may reduce the number of qualifying respondents that fail to complete a survey or UX test out of frustration. In some embodiments, a separate, asynchronous flow is used to perform an analysis of a respondent's answers to determine if the test result quality satisfies a threshold. If not, then the results may not be useful for providing actionable insights. The components and dataflow involved in executing the asynchronous processes are illustrated using the dotted lines in FIG. 1. However, as noted above, the operations of each component may vary depending on the particular implementation.

Figure 3:
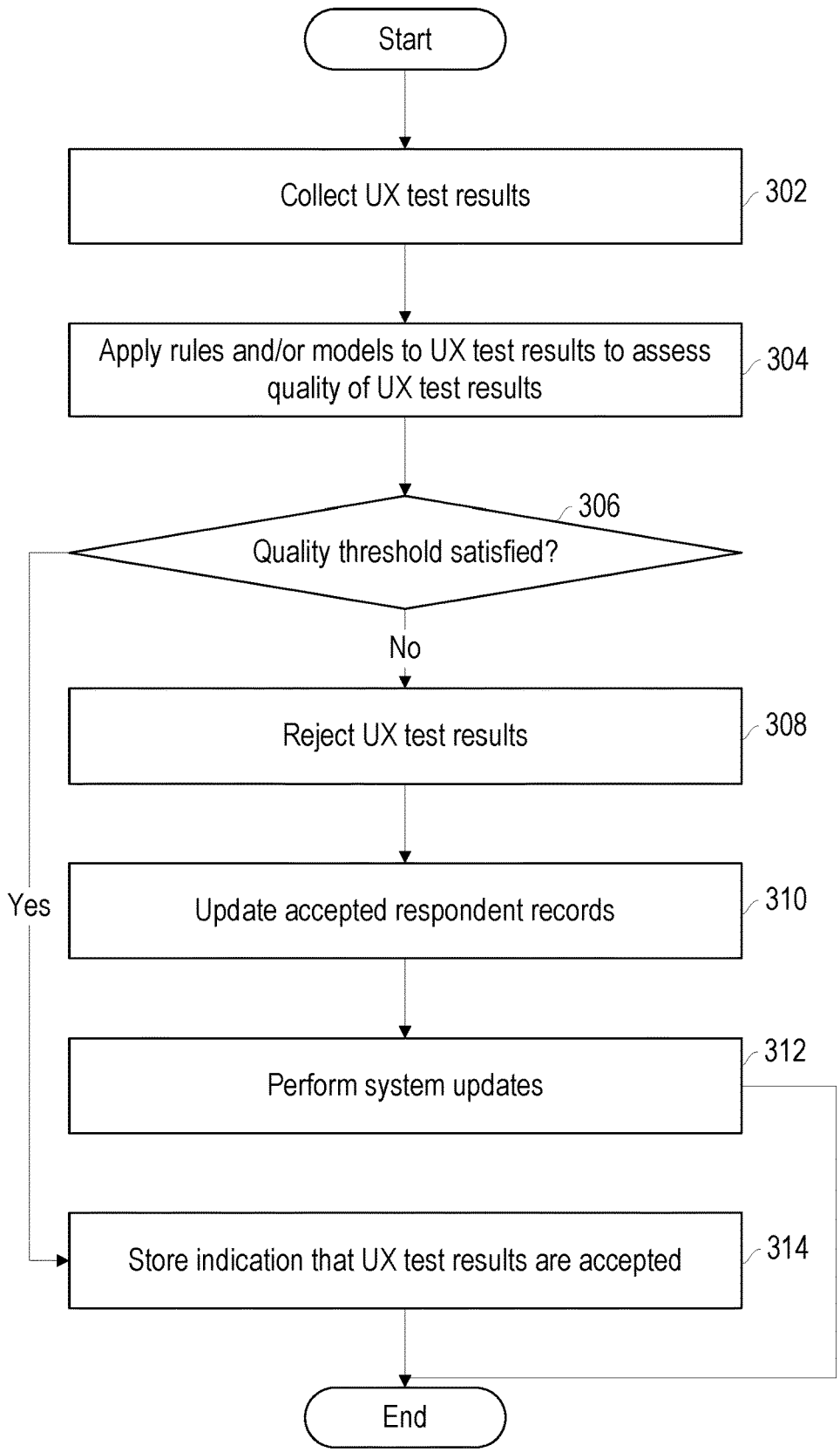
FIG. 3 illustrates an example asynchronous process for providing feedback based on assessments of the quality of user experience test results in accordance with some embodiments.

FIG. 3 illustrates an example asynchronous process for providing feedback based on assessments of the quality of user experience test results in accordance with some embodiments. One or more operations illustrated in FIG. 3 may be modified, rearranged, or omitted all together. Accordingly, the particular sequence of operations illustrated in FIG. 3 should not be construed as limiting the scope of one or more embodiments.

At operation 302, tuning and analytic services 140 collects one or more UX test results. The UX test results that are collected may include results that were completed and/or results for tests that are currently in process. In some embodiments, the results include responses to survey questions. Additionally or alternatively, the results may include scores, performance metrics, and/or other information obtained from tracking user interactions with a product.

At operation 304, tuning and analytic services 140 applies a set of rules and/or models to the UX test results to assess the quality of the test results. In some embodiments, the rules and/or models include the fraud detection rules and/or models described further below in Section 6, titled Fraud Detection and Respondent Curation. Additionally or alternatively, other types of rules and/or models may be applied. In some embodiments, a neural language model is applied to generate a quality score. A neural language model may be trained using examples of high quality results and/or low quality results. To train a model, a set of one or more feature vectors may represent each example in the training dataset.

Weights, bias values, and/or other parameters may be initialized within cells in the neural network (e.g., on a random basis or in any other manner). A forward pass may be performed using the feature vectors to estimate a quality score for each example, which may then be compared to an observed quality score. The difference between the model output and the observed label represents the model's estimation error. Learning processes, such as backpropagation and other gradient descent techniques, may adjust the model parameters to minimize the model's estimation error. Generally, backpropagation assigns a fraction of the error to the neural network nodes and adjusts the weight value of the cells based on the assigned fraction. However, other ML models and learning processes may be used to estimate the quality scores. Additional examples include support vector machines, decision trees with random forest walkthroughs, k-means clustering, and Bayesian models.

A trained model may learn patterns that are indicative of high and/or low quality test results. For example, respondents may copy and paste the same response to multiple questions to expedite finishing the test. The model may pick up on the signal that repeated answers lower the test result quality. Other signals may relate to the syntactic and semantic elements of the language of the responses. Example patterns and signals that the model may pick up on include the use of strong or offensive language, language that is ungrammatical and nonsensical, and answers that are too short and generic to be useful. When applying the model, one or more feature vectors may be formed for a UX test result that has been collected for a qualified respondent. The one or more feature vectors may be formed as a function of the semantic and/or syntactic elements, including the tokens (unigrams or n-grams) used in a response, the number of repetitions of the tokens, the sequence/ordering of the tokens, and other grammatical elements relating to the responses. In the case of a neural language model, the estimated quality score may be generated by performing a forward pass using the feature vector. With other models, the score may be estimated using other processes, such as based on a distance to a cluster centroid in a cluster-based model or the position of a feature vector relative to a hyperplane boundary in a support vector machine.

At operation 306, tuning and analytic services 140 determines whether the quality threshold is satisfied. The threshold score may be a configurable value that is exposed to an end user. If the score satisfies the threshold, then at operation 314, tuning and analytic services 140 stores an indication that the UX test results are accepted. The test results may be added to accepted responses 138 and, if not previously performed, quotas 134 and accepted respondents 136 may be updated accordingly.

If the score does not satisfy the quality threshold, then at operation 308, tuning and analytic services 140 rejects the UX test results. Rejected UX test results may be deleted or stored separately from accepted test results. System 100 may avoid expending resources associated with performing further analytics on rejected UX test results as the results are highly unlikely to provide useful insights into the design of product 102.

When the UX test results are rejected, at operation 310, tuning and analytic services 140 may retroactively remove the respondent that completed the test from the accepted respondent pool. The quotas may also be updated to reflect the change in the accepted respondent pool. For example, if the quota was previously full, the retroactive removal of one or more respondents associated with the quota may open up one or more additional slots. In response to the update, redirect service 128 may begin fielding additional respondents At operation 312, the process performs system updates. The feedback and update mechanism may be performed in the same manner as previously described for the synchronous processes. However, the decisioning on what to update is based on the quality of the responses, and the timing is not synchronous with a respondent's experience.

5. Configuration Updates and Performance Tuning

As previously mentioned, system performance may be optimized by tuning the respondent fielding based on feedback provided from the synchronous and/or asynchronous processes. The tuning process may be implemented to minimize the rejection rate of candidate respondents and maximize the throughput of qualified respondents. By tuning the respondent fielding process, the runtime for a given UX test application or survey needed to obtain a high-quality set of test results may be significantly reduced.

Figure 4:
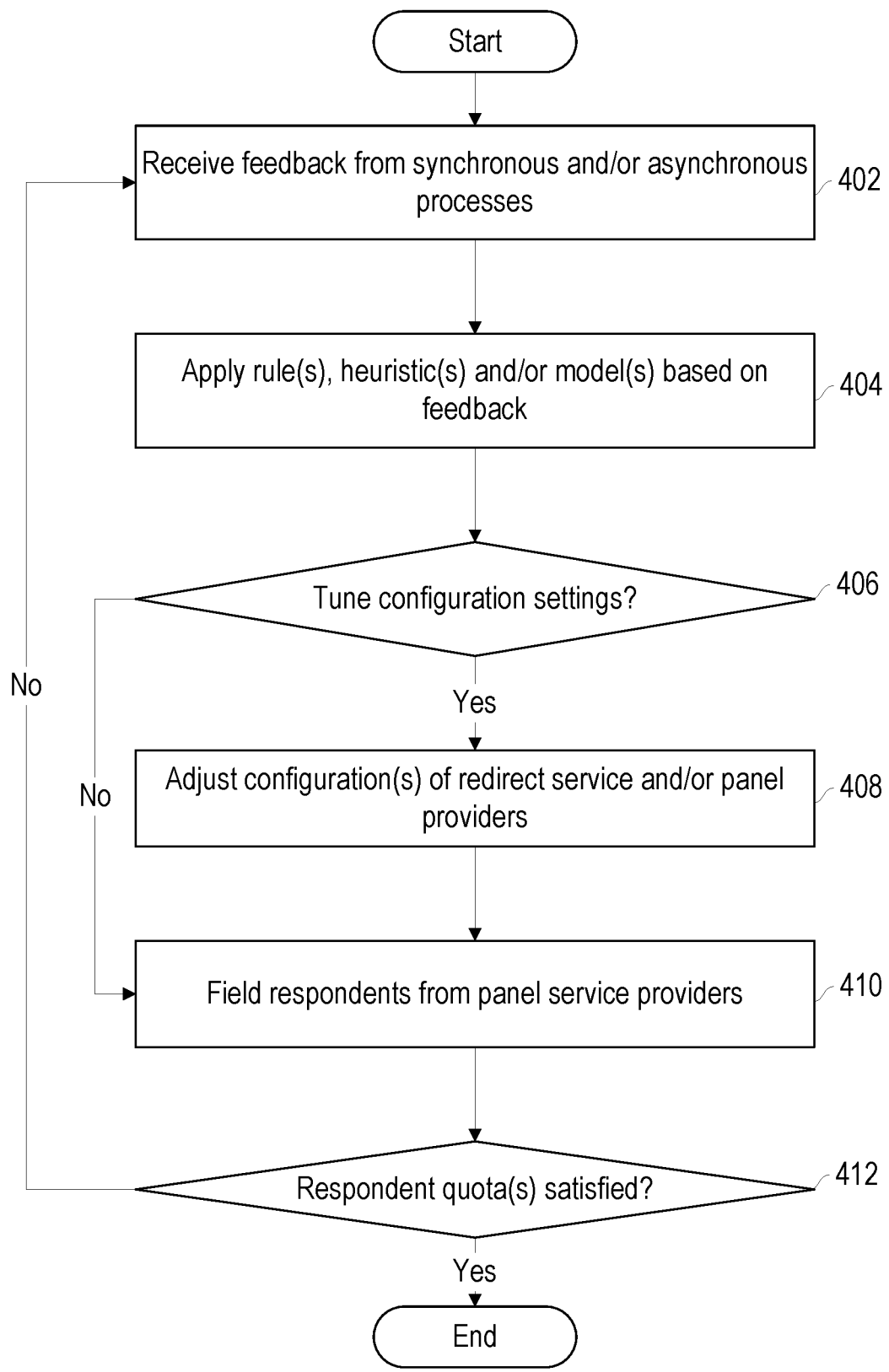
FIG. 4 illustrates an example process for tuning system configuration settings in accordance with some embodiments.

FIG. 4 illustrates an example process for tuning system configuration settings in accordance with some embodiments. One or more operations illustrated in FIG. 4 may be modified, rearranged, or omitted all together. Accordingly, the particular sequence of operations illustrated in FIG. 4 should not be construed as limiting the scope of one or more embodiments.

At operation 402, tuning and analytic services 140 receives feedback from the synchronous and/or asynchronous processes. For example, the feedback may include an indication of which respondents were accepted and/or rejected, which UX test results were accepted and/or rejected, which panel provider was the source of each accepted and/or rejected respondent, what percentage of a quota has been filled, and/or how many respondents are left to fill a remaining quota.

At operation 404, tuning and analytic services 140 applies a set of one or more rules, heuristics, and/or models based on the feedback. For example, a rule may check, based on the feedback, whether a quota is filled and, if so, send notifications to panel providers 126a-n and/or redirect service 128 to change the fielding rate for candidates with a specific attribute to zero. AS another example, rules may defined to adjust the rate of fielding based on how much skew exists between different groups of respondents. If one group has fallen behind 10% where is should be relative to another group, then the fielding rate may be increased by 10% or some or rate defined by the rule.

Heuristic models may approximate optimal configuration settings based on historical patterns and/or other available information. As an example, a heuristic model may continuously monitor the balance between respondents with varying characteristics and adjust fielding rates up or down if the balance deviates more than a threshold. The rate may be adjusted based on historical observations on how quotas are impacted by different fielding rates. For instance, if a quota is defined for 10,000 respondents with 50% respondents having attribute A and 50% respondents of respondents having attribute B, and the balance of respondents deviates more than a threshold percentage (e.g., 20%), then the rates may be adjusted to rebalance the accepted respondent pool. Thus, 40% of the accepted respondent pool is respondents having attribute A, and 60% respondents having attribute B, then a notification may be sent to panel provider 126a-n to increase the rate at which respondents having attribute A are fielded and decrease the rate at which respondents having attribute B are fielded. The rates of the increase and/or decrease may be determined based on historical patterns of how prior rate changes affected quota fulfillment metrics. In response the panel providers may update the distribution of panelists that are served the panel-specific link for initiating the UX test.

Predictive models may use machine learning to predict whether a change in configuration settings would improve system performance. For example, predictive models may predict whether adjustments to the configuration settings would increase or decrease the UX test execution time based on learned patterns. The ML model that is trained and applied may vary depending on the implementation. As indicated above, example ML models include neural networks, SVMs, decision trees, clustering models, and Bayesian models.

Based on the applied rules, heuristics and/or models, tuning and analytic services 140 may determine, at operation 406, whether to tune any configuration settings. For example, if a configuration setting update is predicted to improve execution times or if a rule condition for performing the update is satisfied, then system 100 may proceed with the change during runtime.

At operation 408, tuning and analytic services 140 adjusts one or more configuration settings, which may include redirect service configurations and/or panel-specific configurations. As previously indicated, the configurations may adjust the rates at which panelists with varying attributes are fielded, either increasing or decreasing the proportional rates. Additionally or alternatively, other system configurations may be updated. For example, tuning and analytics services 140 may determine that a respondent rejection rate for candidates sourced from particular panel provider has exceeded a threshold. In response, the system may halt further respondent fielding from the panel provider. As another example, tuning and analytic services 140 may determine that respondents with attribute A have a higher success rate when sourced from one panel provider, and candidates with attribute B have a higher success rate when sourced from another panel provider. In response, the system may notify the panels to increase the rate at which the successful respondents are fielded and decrease the rates for the other respondents.

At operation 410, redirect service 128 fields respondents from panel providers 126a-n, which may use the updated configuration settings if tuned. For example, redirect service 128 may change the rate at which respondents having specific attributes are fielded on a global basis across all panel providers and/or an individual panel provider basis.

At operation 412, system 100 determines whether the respondent quotas are satisfied. If not, then fielding and tuning based on the feedback mechanisms previously described may continue until the UX test or survey is complete.

6. Fraud Detection and Respondent Curation

In some embodiments, system 100 may monitor respondent actions to detect fraudulent activity. As previously mentioned, fraud in this context may be intentional or unintentional. In both cases, if the fraud is not detected, then the result is that a respondent engaging in fraudulent behavior with respect to a UX test may receive payment even though the inputs provided by the respondent are of such a low quality as to be useless or detrimental for its intended purpose (e.g., providing insights into the design of product 102).

Figure 5:
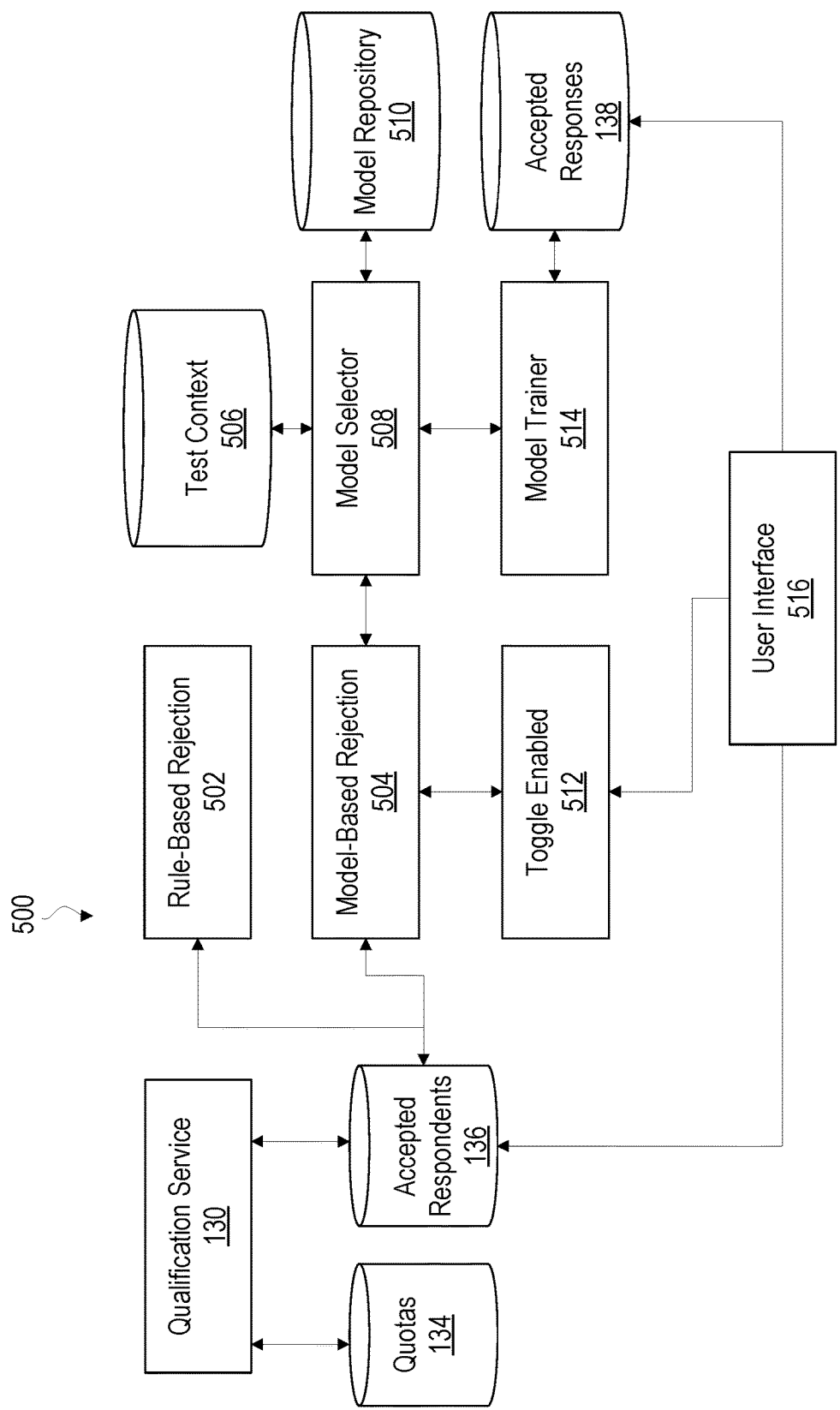
FIG. 5 illustrates an example fraud detection system architecture in accordance with some embodiments.

FIG. 5 illustrates an example fraud detection system architecture in accordance with some embodiments. System 500 may be a subsystem of system 100, including components such as qualification service 130, quotas 134, and accepted respondents 136. In other embodiments, system 500 may be implemented as a separate and independent system. As illustrated in FIG. 5, system 500 includes qualification service 130, rule-based rejection component 502, model-based rejection component 504, model selector 508, toggle enabled component 512, model trainer 514, and user interface 516. In some embodiments, system 500 may include more or fewer components than the components illustrated in FIG. 5. The components illustrated in FIG. 5 may be local to or remote from each other. The components illustrated in FIG. 5 may be implemented in software and/or hardware. Each component may be distributed over multiple applications and/or machines. Multiple components may be combined into one application and/or machine. Operations described with respect to one component may instead be performed by another component.

Referring to FIG. 5, quotas 134 are connected to qualification service 130, which monitors and updates a collection of accepted respondents 136. Qualification service 130 may compare the collection of accepted respondents 136 to quotas 134 for the test respondents. Based on the comparison, qualification service 130 may determine if a test's fielding operation is complete.

Qualification service 130 may also be responsible for feeding back individual respondent rejections and updated quota configurations to utilized panel providers. As described above, the collection of accepted respondents may be synchronously updated as panelists complete the UX test and asynchronously updated by supporting services and user interfaces based on an analysis of the respondent and their associated responses. Examples of the supporting services are described with reference to FIG. 5.

For each respondent that is accepted by qualification service 130, an automation process may be initiated to detect and/or prevent fraudulent behavior. The process components may include rule-based rejection component 502 and/or model-based rejection component 504. Rule-based rejection component 502 applies a set of rules when analyzing a respondent and/or the respondent's activity to determine whether the respondent should be rejected. Model-based rejection component 504 applies one or more ML models to make the determination.

System 500 further includes model selector 508, which selects a trained model from model repository 510 based on test context 506. A test context may be defined by a set of attributes associated with the UX test. Example attributes may include the target respondent set for a test (e.g., is the test targeting sophisticated enterprise users or a less sophisticated general population), the product type being tested, an industry associated with the test/product, and the content of the test (e.g., the type of survey questions included). For instance, the available models may include a business-to-business (B2B) model for UX tests targeting enterprise users and a business-to-consumer (B2C) model for UX tests targeting retail consumers. As another example, the available models may include models trained for different product categories for which the tests are conducted.

Model trainer 514 may train different ML models to apply to different text contexts. During a training phase, model trainer 514 may generate separate training datasets by dividing example test responses into different groups by UX test context. For example, one group may include test results for a UX test associated with a first industry, a second for a second industry, etc. As another example, one group may include test responses from enterprise respondents and another for retail respondents. Model trainer 514 may then train separate and independent ML models for each separate training dataset. As a result, the different trained ML models may pick up on different signals based on UX test contexts and learn patterns accordingly. The ML models may be trained to output scores that estimate a likelihood that a respondent is engaging in fraudulent behavior with respect to a UX test for a given context.

During training, a machine learning algorithm may generate a target model $f$ using an iterative process such that the target model $f$ best fits the datasets of training data to the labels of the training data. The labels in this context may indicate whether the results were fraudulent or accepted. Additionally or alternatively, a machine learning algorithm may generate a target model $f$ such that when the target model $f$ is applied to the datasets of the training data, a maximum number of results determined by the target model $f$ matches the labels of the training data. Different target models be generated based on different machine learning algorithms and/or different sets of training data.

A machine learning algorithm is an algorithm that can be iterated to learn a target model $f$ that best maps a set of input variables to an output variable, using a set of training data. The training data includes datasets and associated labels. The datasets are associated with input variables for the target model $f$. The associated labels are associated with the output variable of the target model $f$. The training data may be updated based on, for example, feedback on the accuracy of the current target model $f$. Updated training data is fed back into the machine learning algorithm, which in turn updates the target model $f$. A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In some embodiments, the training process leverages metadata associated with respondents. Example metadata attributes associated with a respondent may include the IP address used by the respondent to take a UX test, the MAC address of the machine used to take the test, the email address of the respondent, the name of the respondent, and/or other information extracted from a panel provider that is the source of the respondent. When training the model, model trainer 514 may generate one or more feature vectors to represent each training example as a function of the respondent metadata and/or UX test context associated with the example. The feature vector may further incorporate semantic and/or syntactic elements associated with a respondent's answers to survey questions. With respect to a neural network, learning processes, such as backpropagation and other gradient descent techniques, may adjust the model parameters, including cell weights and bias values, to minimize the model's estimation error as previously described. However, other ML models and learning processes may be used to estimate the quality scores.

A trained model may learn patterns that are indicative of respondents engaging in fraudulent activity. For example, respondents may copy and paste the same response to multiple questions to expedite finishing the test. The model may pick up on the signal that repeated answers are fraudulent and should not be accepted. Other signals may relate to the syntactic and semantic elements of the language of the responses. Example patterns and signals that the model may pick up on include the use of strong or offensive language, language that is ungrammatical and nonsensical, which may be indicative that the answer was generated by a bot, and answers that are too short and generic to be useful. When applying the model, one or more feature vectors may be formed for a UX test result that has been collected for a qualified respondent. The one or more feature vectors may be formed as a function of the semantic and/or syntactic elements, including the tokens (unigrams or n-grams) used in a response, the number of repetitions of the tokens, the sequence/ordering of the tokens, and other grammatical elements relating to the responses. The feature vectors may further include metadata associated with the respondent and the UX test context. In the case of a neural language model, the estimated fraud score may be generated by performing a forward pass using the feature vector. With other models, the score may be estimated using other processes, such as based on a distance to a cluster centroid in a cluster-based model or the position of a feature vector relative to a hyperplane boundary in a support vector machine.

Administrative users may interact with system 500 via user interface 516. The user interface may allow the user to trigger various operations and/or configuration changes with respect to system 500. For example, administrative users may provide inputs to toggle-enabled component 512 to pause or resume automated model-based fraud detection and rejection of candidate respondents. As previously noted, providing a mechanism for pausing the ML-based rejection allows operators to determine whether to take a more automated or hands-on approach, which may make the delivery of results more predictable. Further, a mechanism to stop runaway automation may enhance system resilience by mitigating negative effects in scenarios when the ML model predictions flag respondent activity too frequently. Respondent rejections may have a material impact on various facets of a panel provider's operations, including revenue, performance analyses, and selection methodologies. If such a case arises, the administrator may pause or otherwise disable the model-based system, falling back to a more predictable rules-based approach. In other embodiments, system 500 may automatically pause the model-based system if it detects that the rejection rate exceeds a threshold. For instance, if more than half of candidate respondents are rejected, then system 500 may pause or disable use of the ML model to automatically reject candidates. The threshold may vary from implementation to implementation. When paused, the ML-based system may still be applied to decorate respondents with model recommendations for later, subsequent administrator consideration.

User interface may further allow an administrator to review the results of the rule and/or model-based rejection. The administrator may make changes to the model outputs, which may be provided as feedback to model trainer 514 to retrain and/or fine tune the ML models. For instance, the administrator may override an ML model's decision to accept or reject a candidate respondent. Model trainer 514 may use the example and the label assigned by the administrator to update the ML model weights and/or other parameters to apply to new candidates.

Figure 6:
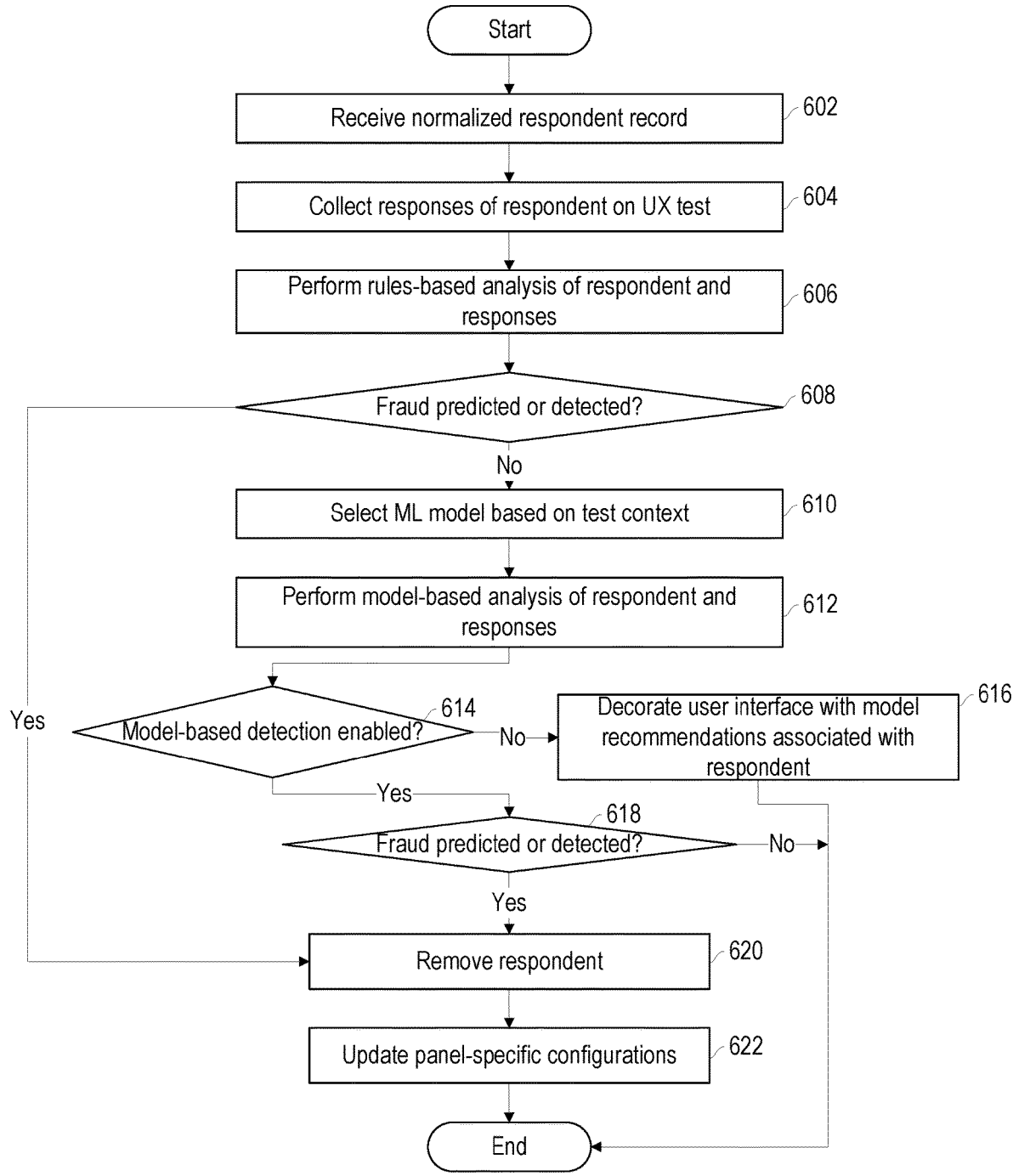
FIG. 6 illustrates an example process for automated curation of respondents in accordance with some embodiments.

FIG. 6 illustrates an example process for automated curation of respondents in accordance with some embodiments. One or more operations illustrated in FIG. 6 may be modified, rearranged, or omitted all together. Accordingly, the particular sequence of operations illustrated in FIG. 6 should not be construed as limiting the scope of one or more embodiments.

At operation 602, qualification service 130 receives a normalized respondent record. In some embodiments, qualification service 130 may extract respondent metadata from the normalized record. The extracted metadata may be used to perform an initial rule-based or model-based check at the outset to determine whether to reject the candidate respondent. For example, if qualification service 130 detects that the respondent has already taken the UX test, then qualification service 130 may reject the candidate to prevent duplicate results. Additionally or alternatively, qualification service 130 may present qualification questions to the respondent before allowing the respondent to take the UX test, as previously described.

If qualification service 130 determines that the respondent is qualified to take the UX test, then, at operation 604, qualification service 130 collects responses of the respondent on the UX test. The collection may be performed in real-time, as the respondent is engaging with the UX test, such as when the respondent submits an answer to a survey question. In other cases, qualification service 130 may collect the results after the respondent has completed the UX test. Qualification service 130 may further perform a batch collection at scheduled times to process test results for multiple respondents that have completed the UX test.

At operation 606, qualification service 130 performs a rules-based analysis of the respondent and collected responses. In some embodiments, the rules-based analysis may check answers for predefined patterns that are indicative of fraudulent activity. For example, the rules-based analysis may flag the use of certain profane words/expressions, responses that have less than a threshold number of characters, responses that are nonsensical, or responses that are overly redundant. Additionally or alternatively, the rules-based analysis may check metadata about the respondent for suspicious behavior, such as a specified age that is above or below a threshold, IP addresses that have been banned, or respondent identification data (e.g., a respondent digital fingerprint) indicating that the respondent is a duplicate. The rules that are defined may vary from implementation to implementation.

At operation 608, qualification service 130 determines, based on the rules-based analysis, whether fraud is predicted or detected. For example, if a banned IP address is detected, then qualification service 130 may reject the UX test results and respondent or, if the check is performed before the respondent has engaged with the UX test, prevent the respondent from proceeding with the test. In other embodiments, qualification service 130 may flag each instance of suspicious behavior detected within the respondent metadata and/or responses. Qualification service 130 may reject the respondent if the number of flags exceeds a threshold. As a result, the respondent is removed from the collection of accepted respondents, and the rejection may be communicated to the supplying panel provider. The feedback may be used by the panel provider to remove the flagged respondent from the collection of respondents for which compensation is provided.

If the respondent is not flagged as fraudulent by the rules-based analysis, then system 500 may apply a model-based analysis. At operation 610, model selector 508 selects an ML model based on the test context. As previously noted, several different trained models may be stored in model repository 510 for use in different test contexts. Model selector 508 may compare the attributes of the UX test for which model-based fraud detection is performed with the attributes mapped to each different model. Model selector 508 may then select the ML model having attributes matching the test context. The unselected models are not used to perform fraud detection for the current test context.

At operation 612, qualification service 130 performs a model-based analysis of the respondent and/or the responses. For example, qualification service 130 may generate a feature vector based on the respondent metadata, the tokens (unigrams or n-grams) used in the responses submitted by the respondent, the number of repetitions of the tokens across different responses and/or within individual responses, the sequence/ordering of the tokens, and other grammatical elements relating to the responses. Qualification service 130 may perform a forward pass using the selected model or otherwise apply the model using the generated feature vector as previously described. The output of the model may include a score representing a probability that the respondent has or will engage in fraudulent activity with respect to the UX test.

At operation 614, qualification service 130 determines whether model-based detection is enabled. As previously noted, use of the trained ML model for automatic fraud prevention may be paused or otherwise disabled. In some embodiments, when the model is paused, qualification service 130 still performs the model-based analysis by applying the ML model. However, qualification service 130 limits the analysis to providing recommendations to an operator rather than automatically rejecting and removing respondents.

At operation 616, qualification service 130 decorates a user interface with model recommendations associated with the respondent. For example, if the score of the respondent exceeds or otherwise satisfies a threshold, then qualification service 130 may recommend that the respondent be rejected and removed from the accepted respondent pool. Conversely, if the score is below the threshold, then qualification service 130 may indicate that fraudulent activity was not detected and recommend that the respondent not be removed. The user interface, including decorations, may be generated and rendered within a browser or other client application used by an administrator. An example user interface is presented in Section 7, titled Example User Interface.

In other embodiments, when use of the ML model for automatic respondent curation is disabled, qualification service 130 may proceed without performing any model-based analysis. In this case, operation 614 may come before operation 612, and operation 612 may be skipped when model-based detection is paused.

If model-based detection is enabled, then at operation 618, qualification service 130 determines, based on the model-based analysis of the respondent and responses, whether fraud is predicted or detected. For example, qualification service 130 may determined whether the score of the respondent exceeds or otherwise satisfies a threshold. The threshold score may be the same or different than the thresholds used to decorate the user interface. In some embodiments, the threshold score for rejecting a candidate respondent may be exposed to and configurable by an operator or administrator. Additionally or alternatively, the score may be dynamically adjusted based on a rejection rate. If the rejection rate exceeds a threshold, then the score may be reduced during runtime to increase the acceptance rate of respondents. A floor may be set to prevent the threshold from being reduced more than a specified amount.

If fraud is predicted or detected, then at operation 620, qualification service 130 removes the respondent. The removal may be retroactive after the respondent has already completed the UX test. In other cases, the respondent may automatically be removed before or mid-test if fraudulent behavior is detected or predicted. Qualification service 130 may update quotas 134 as appropriate, such as by adding a slot to a quota that was previously filled by the removed respondent.

At operation 622, qualification service 622 updates panel-specific configurations. The updates may include notifying the source panel provider of the removal of the respondent, adjusting the rates at which respondents are fielded, and/or any of the other configuration updates previously described.

7. Example User Interface

In some embodiments, user interface 516 allows an operator to toggle between enabled and disabled states for model-based rejection 504. When enabled, qualification service 130 uses the trained ML model to automatically reject respondents based on detected or predicted fraudulent behavior with respect to a UX test. When paused/disabled, qualification service 130 does not use the trained ML model to automatically reject respondents. However, the ML model may still be used to provide recommendations and decorate user interfaces as previously indicated.

FIG. 7 illustrates a user interface for providing input for controlling and tuning machine learning model parameters in accordance with some embodiments. User interface 700 represents a dashboard through which operators may navigate to view UX test results and corresponding recommendations. User interface 700 presents details about the UX test, including the name and other identifiers associated with the test. User interface 700 further presents control 702, allowing the operator to pause and resume model-based automatic curation/removal of respondents. In the paused state, the rules-based analysis may still be enabled and used to automatically reject candidates. That is, after pausing or disabling the use of the trained ML model for automatic curation, respondents may still be automatically rejected based on the rules-based analysis. However, in other embodiments, the rules-based analysis may also be disabled, be independently disabled, and/or be omitted entirely. In the paused state, the model-based analysis refrains from automatically removing respondents and is used to decorate the user interface with recommendations.

The user may select the play button on control 702 to resume model-based automatic curation. In response, system 500 may toggle model-based rejection component 504 to an enabled state. When no longer paused, model-based rejection component 504 uses the trained ML model to perform automatic rejection and curation for new respondents. Thus, new respondents that engage in fraudulent behavior are removed or blocked from the accepted respondent pool.

User interface 700 further presents decorated respondent records 704, which include the model recommendation with respect to the respondent, the respondent identifier, the model's acceptance (or fraud) score for the respondent, the response set submitted by the respondent during the UX test, and a control that allows an operator to reject the respondent. In the example illustrated, the model recommends rejecting the first respondent and accepting the second respondent based on the corresponding scores, which represent the estimated probability that the respondent is engaging in fraudulent behavior. From the result sets, it can be seen that the first respondent has submitted several redundant answers. The second respondent has some answers that may not be useful, but overall the results are much more relevant to the survey questions being asked.

User interface 700 allows the operator to reject one or more of the respondents on a manual basis. For example, the operator may select control 706 to reject the first respondent listed. In response to selecting control 706, the respondent is removed from the accepted respondent pool, the appropriate quota is updated, and the panel-specific configurations are adjusted. The test results may be discarded or stored separately from the accepted test results.

8. Machine Learning Model Training and Tuning

In some embodiments, user interface 700 provides feedback for training and tuning the ML model. For example, if the operator selects the control to reject the second respondent, then the operator's action conflicts with the model recommendation, which is to accept the respondent. The selection to accept or reject a respondent may thus serve as a label for a new example from which the ML model may learn through retraining and/or tuning. This feedback may be provided to a tuning process to adjust the parameters of the relevant ML model(s).

Figure 8:
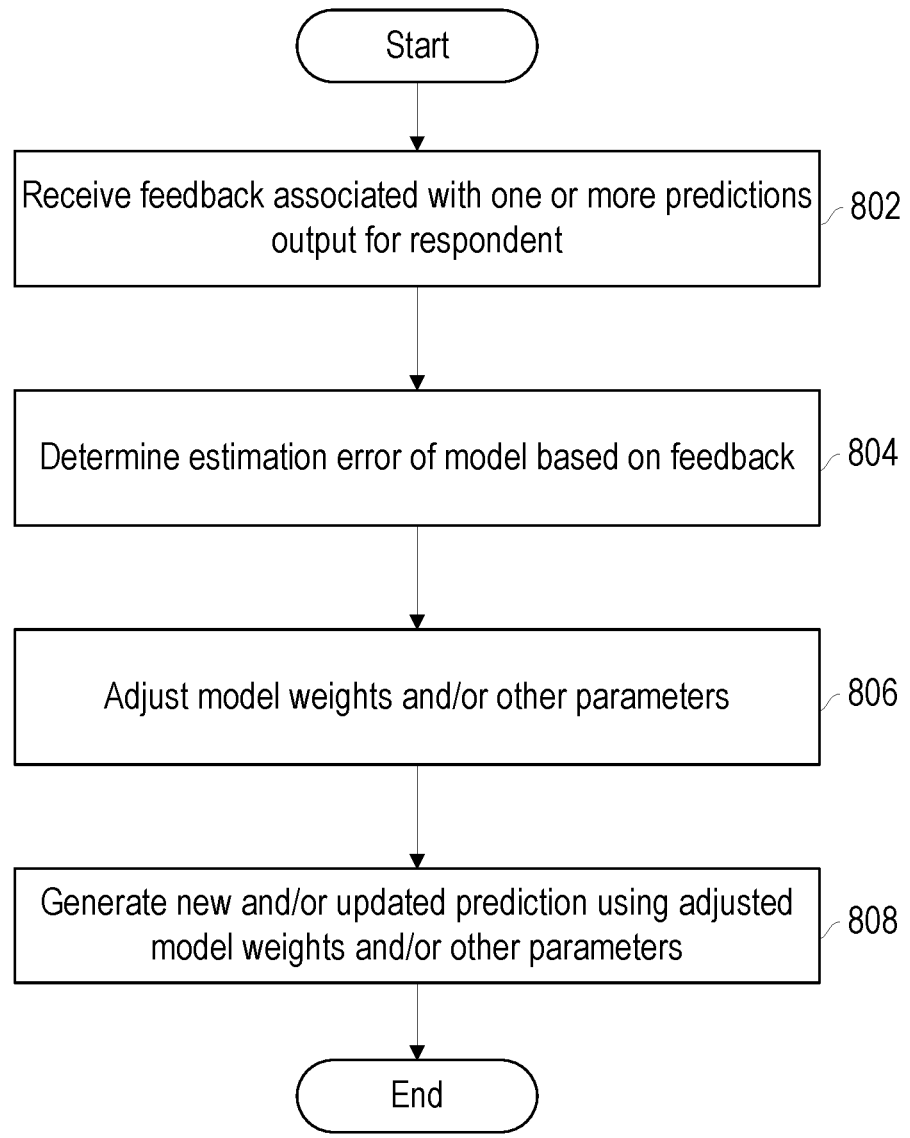
FIG. 8 illustrates an example process for tuning a machine learning model based on feedback in accordance with some embodiments.

FIG. 8 illustrates an example process for tuning a ML model based on feedback in accordance with some embodiments. One or more operations illustrated in FIG. 8 may be modified, rearranged, or omitted all together. Accordingly, the particular sequence of operations illustrated in FIG. 8 should not be construed as limiting the scope of one or more embodiments.

At operation 802, the process receives feedback associated with one or more predictions output by a ML model. In some embodiments, the feedback comprises adjustments to an acceptance or fraud score. For example, an analyst may increase or decrease the score predicted for a respondent. In other embodiments, the feedback may be a binary classifier indicating whether the respondent is accepted or rejected.

At operation 804, the process an estimation error of the model based on the received feedback. The estimation error may be determined by computing a difference between the adjusted and predicted value of a score. Additionally or alternatively, the estimation error may be determined based on a difference between the predicted and observed binary classifier.

At operation 806, the process adjusts the model weights and/or other parameters based on the estimation error. For instance, a model may train and tune a neural network using backpropagation. As previously noted, backpropagation is a process of updating cell states in the neural network based on gradients determined as a function of the estimation error. In other embodiments, the process may use other machine learning algorithms to train and tune model parameters, such as regression analysis or other methods based on gradient descent.

At operation 808, the process generates new and/or updated predictions using the adjusted model weights and/or other parameters. For example, cell weights within a neural network of an encoder and/or decoder block may be adjusted. Additionally or alternatively, parameters of the attention layer and/or other configurations of various blocks may be tuned.

9. Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an API.

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

10. Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using Hypertext Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

11. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 9:
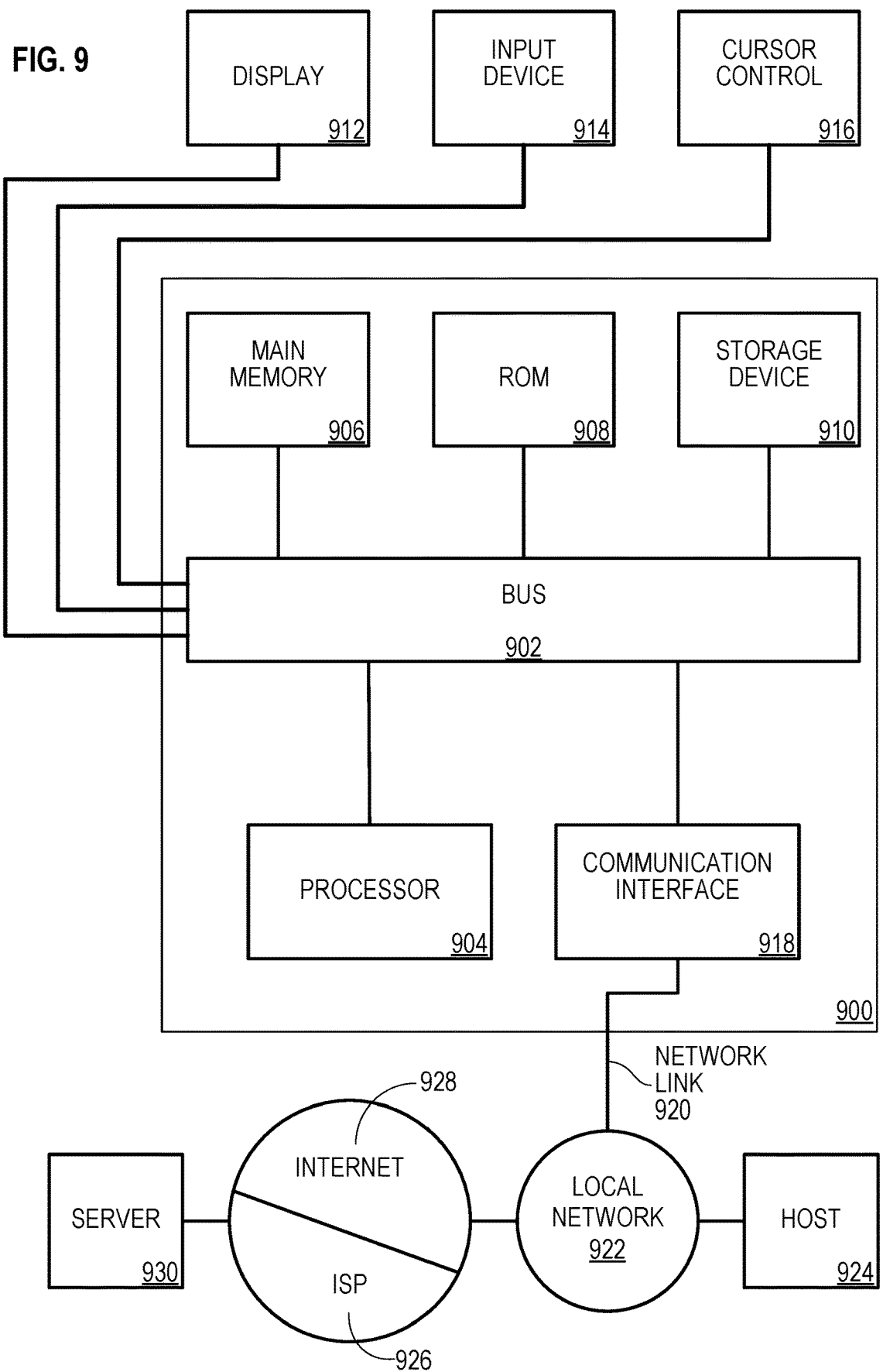
FIG. 9 illustrates a computer system in accordance with some embodiments.

For example, FIG. 9 illustrates a computer system in accordance with some embodiments. Computer system 900 includes a bus 902 or other communication mechanism for communicating information, and a hardware processor 904 coupled with bus 902 for processing information. Hardware processor 904 may be, for example, a general-purpose microprocessor.

Computer system 900 also includes a main memory 906, such as a random-access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

12. Miscellaneous; Extensions

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims. Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    monitoring, by a network service using at least one trained machine learning model, activity of respondents of a user experience test or survey for fraudulent behavior, wherein the at least one trained machine learning model has been enabled to automatically remove respondents from a set of accepted respondents for the user experience test or survey;
    generating, by the network service using the at least one trained machine learning model based at least in part on one or more inputs of a respondent, a score representing an estimated likelihood that the respondent is engaging in fraudulent behavior with respect to the user experience test or survey;
    responsive to determining that the score exceeds a threshold, removing the respondent from the set of accepted respondents for the user experience test or survey;
    detecting, by the network service responsive to removing the respondent, that a rate at which the at least one trained machine learning model has detected fraud has exceeded a threshold; and
    responsive to detecting that the rate at which the at least one trained machine learning model has detected fraud has exceeded the threshold, pausing or disabling, by the network service, use of the at least one trained machine learning model for automatic respondent removal, wherein pausing or disabling use of the at least one trained machine learning model for automatic respondent removal includes pausing or disabling additional model training and application of the at least one trained machine learning model to automatically remove respondents of the user experience test or survey.

2. The method of claim 1, further comprising: applying, by the network service, a set of rules to determine whether the respondent is engaging in fraudulent behavior; wherein the at least one trained machine learning model is applied responsive to determining that the set of rules have not flagged the respondent as engaging in fraudulent behavior.

3. The method of claim 1, further comprising: receiving a command from a user submitted through a user interface; and responsive to receiving the command, resuming, by the network service, use of the at least one trained machine learning model for automatic respondent removal.

4. The method of claim 1, wherein after pausing or disabling the use of the at least one trained machine learning model for automatic respondent removal, the network service continues to use the trained machine learning model to generate recommendations for new respondents for the user experience test or survey; wherein the network service does not automatically remove respondents from the set of accepted respondents while use of the at least one trained machine learning model for automatic respondent removal is paused or disabled.

5. The method of claim 4, further comprising: unpausing use of the at least one trained machine learning model for automatic respondent removal; wherein the network service removes or blocks new respondents from the set of accepted respondents using the at least one trained machine learning model while use of the at least one trained machine learning model for automatic respondent removal is no longer paused.

6. The method of claim 1, wherein after pausing or disabling the use of the at least one trained machine learning model for automatic respondent removal, the network service continues to use a set of rules to flag fraudulent activity.

7. The method of claim 1, further comprising: generating a notification to a panel provider responsive to determining that the score exceeds the threshold.

8. The method of claim 1, wherein generating the score comprises:
    generating a feature vector based at least in part on metadata associated with the respondent and responses submitted by the respondent during the user experience test or survey; wherein the feature vector is fed as input to the at least one trained machine learning model; wherein the at least one trained machine learning model applies a set of model weights to the feature vector to estimate the score.

9. The method of claim 1, further comprising: training a plurality of models, wherein each model of the plurality of models is trained to detect fraudulent behavior for different user test contexts.

10. One or more non-transitory computer-readable media storing instructions which, when executed by one or more hardware processors cause:
monitoring, by a network service using at least one trained machine learning model, activity of respondents of a user experience test or survey for fraudulent behavior, wherein the at least one trained machine learning model has been enabled to automatically remove respondents from a set of accepted respondents for the user experience test or survey;
generating, by the network service using the at least one trained machine learning model based at least in part on one or more inputs of a respondent, a score representing an estimated likelihood that the respondent is engaging in fraudulent behavior with respect to the user experience test or survey;
responsive to determining that the score exceeds a threshold, removing the respondent from the set of accepted respondents for the user experience test or survey;
detecting, by the network service responsive to removing the respondent, that a rate at which the at least one trained machine learning model has detected fraud has exceeded a threshold; and
responsive to detecting that the rate at which the at least one trained machine learning model has detected fraud has exceeded the threshold, pausing or disabling, by the network service, use of the at least one trained machine learning model for automatic respondent removal, wherein pausing or disabling use of the at least one trained machine learning model for automatic respondent removal includes pausing or disabling additional model training and application of the at least one trained machine learning model to automatically remove respondents of the user experience test or survey.

11. The media of claim 10, wherein the instructions further cause: applying, by the network service, a set of rules to determine whether the respondent is engaging in fraudulent behavior; wherein the at least one trained machine learning model is applied responsive to determining that the set of rules have not flagged the respondent as engaging in fraudulent behavior.

12. The media of claim 10, wherein the instructions further cause:
receiving a command from a user submitted through a user interface; and responsive to receiving the command, resuming, by the network service, use of the at least one trained machine learning model for automatic respondent removal.

13. The media of claim 10, wherein after pausing or disabling the use of the at least one trained machine learning model for automatic respondent removal, the network service continues to use the trained machine learning model to generate recommendations for new respondents for the user experience test or survey; wherein the network service does not automatically remove respondents from the set of accepted respondents while use of the at least one trained machine learning model for automatic respondent removal is paused or disabled.

14. The media of claim 13, wherein the instructions further cause: unpausing use of the at least one trained machine learning model for automatic respondent removal; wherein the network service removes or blocks new respondents from the set of accepted respondents using the at least one trained machine learning model while use of the at least one trained machine learning model for automatic respondent removal is no longer paused.

15. The media of claim 10, wherein after pausing or disabling the use of the at least one trained machine learning model for automatic respondent removal, the network service continues to use a set of rules to flag fraudulent activity.

16. The media of claim 10, wherein the instructions further cause: generating a notification to a panel provider responsive to determining that the score exceeds the threshold.

17. The media of claim 10, wherein generating the score comprises:
generating a feature vector based at least in part on metadata associated with the respondent and responses submitted by the respondent during the user experience test or survey; wherein the feature vector is fed as input to the at least one trained machine learning model; wherein the at least one trained machine learning model applies a set of model weights to the feature vector to estimate the score.

18. A system comprising:
one or more hardware processors;
one or more non-transitory computer-readable media storing instructions which, when executed by the one or more hardware processors cause:
monitoring, by a network service using at least one trained machine learning model, activity of respondents of a user experience test or survey for fraudulent behavior, wherein the at least one trained machine learning model has been enabled to automatically remove respondents from a set of accepted respondents for the user experience test or survey;
generating, by the network service using the at least one trained machine learning model based at least in part on one or more inputs of a respondent, a score representing an estimated likelihood that the respondent is engaging in fraudulent behavior with respect to the user experience test or survey;
responsive to determining that the score exceeds a threshold, removing the respondent from the set of accepted respondents for the user experience test or survey;
detecting, by the network service responsive to removing the respondent, that a rate at which the at least one trained machine learning model has detected fraud has exceeded a threshold; and
responsive to detecting that the rate at which the at least one trained machine learning model has detected fraud has exceeded the threshold, pausing or disabling, by the network service, use of the at least one trained machine learning model for automatic respondent removal, wherein pausing or disabling use of the at least one trained machine learning model includes pausing or disabling additional model training and application of the at least one trained machine learning model to automatically remove respondents of the user experience test or survey.

19. The system of claim 18, wherein the instructions further cause:
applying, by the network service, a set of rules to determine whether the respondent is engaging in fraudulent behavior; wherein the at least one trained machine learning model is applied responsive to determining that the set of rules have not flagged the respondent as engaging in fraudulent behavior.

20. The system of claim 18, wherein the instructions further cause:
  receiving a command from a user submitted through a user interface; and responsive to receiving the command, resuming, by the network service, use of the at least one trained machine learning model for automatic respondent removal.

\* \* \* \* \*